2,955,133

PREPARATION OF 7-HYDROXY HEPTANOIC ACID AND DERIVATIVES THEREOF

Eugene V. Hort, Westfield, N.J., assignor to Air Reduction Company, Incorporated, New York, N.Y., a corporation of New York No Drawing. Filed Apr. 29, 1957, Ser. No. 655,535

5 Claims. (Cl. 260—484)

This invention relates to the hydrogenation of 3-(2-furyl) acrylic acid and ester derivatives thereof under controlled conditions to produce 7-hydroxyheptanoic acid and derivatives thereof in an improved manner and in higher yields than have heretofore been obtained. The invention more specifically involves the hydrogenation of 3-(2-furyl) acrylic acid and its derivatives in the presence of a platinum catalyst and an acid promoter which results in the cleavage of the furan ring in the 1,2-position to produce 7-hydroxyheptanoic acid or derivatives thereof. The invention includes carrying out the hydrogenation of 3-(2-furyl) acrylic acid in the presence of a platinum catalyst and an acid promoter.

The 7-hydroxyheptanoic acid and various derivatives thereof such as 7-acetoxyheptanoic acid and mono- and polyesters of 7-hydroxyheptanoic acid such as methyl and ethyl 7-hydroxyheptanoate are useful as intermediates in the synthesis of suberic acid and 7-aminoheptanoic acid. Suberic acid and 7-aminoheptanoic acid are in turn useful as fiber monomers in the formation of polyamides and superpolyamides such as nylon.

By use of the term 3-(2-furyl) acrylic acid throughout this specification, I mean to include the various derivatives thereof which can also be hydrogenated according to this invention such as methyl 3-(2-furyl) acrylate and ethyl 3-(2-furyl) acrylate and the like.

As is well known in the art, hydrogenation can involve two distinct types of reactions; an addition hydrogenation and a destructive hydrogenation. The latter type of hydrogenation involves actual cleavage of a bond and is more commonly referred to as a hydrogenolysis reaction. The former addition hydrogenation reaction involves the direct addition of hydrogen to the compound being hydrogenated.

The reaction of this invention actually involves both types of hydrogenation reactions referred to above in that the carbon-oxygen bond of the furan ring is broken in the 1,2-position, and hydrogen is added to the double bonds of the furan ring in addition to the double bond of the acrylic side chain.

I have found that the use of platinum catalysts such as platinum black and platinous oxide together with an acid promoter to promote the hydrogenation of 3-(2-furyl) acrylic acid has proved to be particularly effective in the production of 7-hydroxyheptanoic acid and derivatives thereof.

The addition of small amounts of an acid promoter to the hydrogenation reaction in addition to the platinum catalyst markedly increases the rate of hydrogenation as well as the amount of hydrogenation, resulting in significantly higher yields than have heretofore been obtained.

The reaction conditions of this invention have proved to be particularly effective in causing cleavage of the furan ring in the 1,2-position in contrast to the dominant cleavage in the 1,5-position previously obtained.

The order of the hydrogenation reactions is also important according to this invention. Under the reaction conditions set forth herein, the hydrogenolysis reaction or the cleavage of the furan ring takes place before the addition hydrogenation is completed resulting in the formation of an unsaturated derivative of 7-hydroxyheptanoic acid which is subsequently further reduced.

To illustrate this more clearly and graphically the hydrogenation of 3-(2-furyl) acrylic acid having the following formula

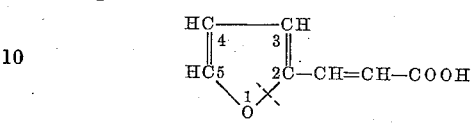

when reacted under the conditions of this invention is cleaved in the 1,2-position as illustrated by the dotted line in the above formula to form an unsaturated cleaved product, and the unsaturated cleaved product is in turn subsequently hydrogenated to 7-hydroxyheptanoic acid having the formula $$HO(CH_2)_6—COOH$$

The amount of platinum catalyst which can be used according to this invention is not critical. The minimum amount should be sufficient to promote the reaction while the maximum limitation of the amount of platinum catalyst will be more controlled by economic considerations.

I have found that I can use between about 0.5% to 1.5% by weight platinous oxide catalyst based on the total weight of the 3-(2-furyl) acrylic acid. An amount of platinum catalyst less than about 0.5% slows down the rate of hydrogenation significantly while amounts in excess of about 1.5%, although they promote the hydrogenation rate more rapidly, prevent optimum hydrogen absorption. I have found that an amount of catalyst between about 0.9% to 1% by weight based on the weight of the 3-(2-furyl) acrylic acid is advantageous.

Various acids or Lewis acids can be used as acid promoters according to this invention including sulfuric acid, hydrochloric acid, ferric chloride, zinc chloride, aluminum chloride, and the like as well as carboxylic acids such as acetic acid. The use of strong mineral acids has been found to be particularly effective.

The amount of acid which can be utilized as a promoter according to this invention can be varied depending upon the particular acid being used. The amount of acid used is not critical, and an amount should be chosen to produce optimum yield and rate of reaction. When using concentrated sulfuric acid as a promoter, for example, I have found that between 5 to 10 drops is advantageous when reacting 0.15 to about 0.3 mol of 3-(2-furyl) acrylic acid. When a weaker acid is used, the amount of acid should be correspondingly increased in order to obtain predominant cleavage of the furan ring in the 1,2-position. When using acetic acid as a promoter, I have used about 150 mls. of acetic acid per 0.3 mol of 3-(2-furyl) acrylic acid although lesser or greater amounts could be used. In this case the acetic acid also acts as a solvent for the 3-(2-furyl) acrylic acid.

I have also found that it is advantageous to maintain the reaction under substantially anhydrous conditions since the presence of excess water interferes with the reaction.

Generally, the hydrogenation can be carried out under pressure in a closed vessel such as an autoclave or a low-pressure Parr hydrogenator. Hydrogen can be admitted to the closed vessel under a pressure of about 50 p.s.i.g. and the vessel subjected to a rocking action. As the hydrogen pressure in the vessel drops due to hydrogen absorption, it can be recharged with hydrogen to again bring the pressure up to about 60 p.s.i.g. and this procedure continued until no more hydrogen is absorbed. During the initial stages of the reaction the hydrogen is absorbed very rapidly and the rate of absorption decreases as the reaction proceeds. I have found that a hydrogen pressure of about 50 p.s.i.g. is advantageous but higher or lower pressures can be used if desired.

The hydrogenation is also advantageously carried out in the presence of a solvent for the 3-(2-furyl) acrylic acid to prevent resinification. Various solvents can be used according to this invention including inert solvents such as dioxane, cyclohexane, and heptane; alcohols such as methanol, ethanol, and n-butanol; esters such as ethyl acetate; and acids such as acetic acid.

The composition of the reaction products obtained by the hydrogenation of 3-(2-furyl) acrylic acid actually depends mainly upon the particular solvent used and whether or not an acid promoter is used.

When hydrogenation of 3-(2-furyl) acrylic acid takes place in the presence of an inert solvent such as dioxane, a platinum catalyst, and an acid promoter, the resulting reaction mixture consists of three main components: 4-heptanolactone, tetrahydrofurylpropionic acid, and polyesterified 7-hydroxyheptanoic acid.

The polyesterified 7-hydroxyheptanoic acid can be recovered as the distillation residue. More specifically, the reaction mixture can be filtered into a Vigreux column, the solvent removed at low temperature and reduced pressure, and the residual liquid fractioned. The first fraction is mainly 4-heptanolactone; the second, tetrahydrofurylpropionic acid; and the undistillable residue, polyesterified 7-hydroxyheptanoic acid.

When the hydrogenation takes place in the presence of an acid solvent such as acetic acid, a platinum catalyst and an acid promoter such as sulfuric acid, the 7-hydroxyheptanoic acid is not obtained in the form of a polyester distillation residue, but is refluxed and obtained as 7-acetoxyheptanoic acid. The 7-acetoxyheptanoic acid can be obtained and recovered from the hydrogenation reaction mixture by filtering out the catalyst and refluxing the reaction mixture for about 18 hours. The refluxed reaction mixture can then be diluted with about two volumes of water and extracted with chloroform. The extract can then be placed in a Vigreux column, the volatiles (acetic acid and chloroform) removed at low temperature and reduced pressure, and the residual liquid fractioned through the Vigreux column.

The first fraction comes over at 65–68° C. at 2 mm. pressure and is mainly 4-heptanolactone, and the second at 133–136° C. at 2 mm. pressure and is mainly a mixture of 7-acetoxyheptanoic acid and 7-acetoxy-4-hydroxy heptanoic acid lactone. A small amount of polyesterified 7-hydroxyheptanoic acid residue also generally remains. The 7-acetoxyheptanoic acid can be recovered by extraction in dilute sodium bicarbonate solution since the 7-acetoxy-4-hydroxyheptanoic acid lactone is insoluble therein. The sodium bicarbonate solution can then be acidified, extracted with chloroform, and distilled to obtain the purified 7-acetoxyheptanoic acid.

When the hydrogenation takes place in the presence of an alcohol such as ethanol, a platinum catalyst and an acid promoter, the products react with the alcohol. In the case of ethanol, for example, the reaction mixture consists mainly of ethyl heptanoate, a lactone-ester mixture which is essentially the ethyl ester of tetrahydrofurylpropionic acid and 4-heptanolactone, ethyl 7-hydroxyheptanoate, and some polyesterified 7-hydroxyheptanoic acid.

The 7-hydroxyheptanoate and the polyester can also be recovered from the reaction mixture by fractionation. The hydrogenation reaction mixture can be filtered from the catalyst, refluxed for about 2 hours, and the solvent and other volatiles removed at low temperature and reduced pressure. The refluxed reaction mixture can be diluted with about one volume of water, extracted with chloroform, and the solvent removed from the extract. The residual oil can then be fractionally distilled through a Vigreux column. The first fraction comes over at 60–65° C. at 6.5 mm. pressure and is mainly ethyl heptanoate; the second fraction comes over at 90–93° C. at 6.5 mm. pressure and is mainly a lactone-ester mixture; and the third fraction comes over at 102–105° C. at 2.5 mm. pressure and is mainly ethyl 7-hydroxyheptanoate. A small amount of residual 7-hydroxyheptanoic acid polyester also generally remains.

The 7-hydroxyheptanoic acid can also be obtained in the form of various other derivatives in addition to those specifically set forth above and can be separated from the reaction mixture by known procedures to obtain the derivative as will be apparent to those skilled in the art.

The various derivatives of 7-hydroxyheptanoic acid produced according to this invention can be converted to 7-hydroxyheptanoic acid by well-known means and the acid itself employed to form the suberic acid or 7-aminoheptanoic acid. For example, the acid can be formed from the ethyl 7-hydroxyheptanoate by hydrolysis.

The valuable fiber-forming suberic acid and 7-aminoheptanoic acid can also be advantageously synthesized directly from the various derivatives of 7-hydroxyheptanoic acid in well-known manners as will be apparent to those skilled in the art.

I have found, however, that when the isolated derivative is polyesterified 7-hydroxyheptanoic acid, the polyester can be advantageously refluxed with a large excess of acetic acid together with a few drops of concentrated sulfuric acid for about 2 hours to obtain 7-acetoxyheptanoic acid. The acetoxy acid can be recovered by pouring the refluxed product into ice water and extracting with chloroform. The low-boiling constituents can be removed at low temperature and reduced pressure and the extract fractioned to obtain the colorless liquid 7-acetoxyheptanoic acid.

The monoesters of 7-hydroxyheptanoic acid such as ethyl 7-hydroxyheptanoate can be reacted in the same manner to obtain 7-acetoxyheptanoic acid.

The 7-acetoxyheptanoic acid can be reacted with a concentrated hydrogen halide such as hydriodic acid to form the 7-haloheptanoic acid, for example, by heating hydriodic acid and 7-acetoxyheptanoic acid to the boiling point, cooling, diluting with about two volumes of water, and chilling to obtain the crystalline 7-iodoheptanoic acid.

7-aminoheptanoic acid can be produced from 7-iodoheptanoic acid by amination. The 7-iodoheptanoic acid can be reacted with dilute ammonia solution by maintaining the reaction mixture at 45–50° C. for about 70 hours. The reaction product can be concentrated at reduced pressure below 50° C., diluted with ethanol, and chilled to precipitate the white 7-aminoheptanoic acid.

The polyester and monoester derivatives of 7-hydroxyheptanoic acid can also be reacted with a hydrogen halide to yield the corresponding haloester. For example, ethyl 7-hydroxyheptanoate can be dissolved in ethanol, saturated with hydrogen bromide at about 5° C., and allowed to stand overnight. The resulting pure ethyl 7-bromoheptanoate can be recovered by distillation.

The ethyl 7-bromoheptanoate can be reacted with sodium cyanide and sodium hydroxide to form suberic acid. This reaction can readily be carried out by dissolving the ethyl 7-bromoheptanoate in ethanol and refluxing it for about 20 hours in the presence of sodium cyanide and water, adding sodium hydroxide and additional water, and continuing the refluxing for about 7 hours more. The reaction product can then be cooled and acidified with hydrochloric acid to precipitate the suberic acid.

*Example 1*

41.4 grams (0.30 mol) of 3-(2-furyl) acrylic acid, 0.400 gram of platinum oxide, and 150 mls. of acetic acid were placed in a low-pressure Parr hydrogenator and the hydrogenator pressurized with hydrogen at 50 p.s.i.g. The hydrogenator was cooled under continuously running tap water and continuously rocked for about 50 minutes. During this time the hydrogen pressure dropped to 30 p.s.i.g. The rocking was interrupted momentarily and the hydrogen pressure restored to 50 p.s.i.g. This procedure was continued as long as hydrogen was absorbed at an appreciable rate. A total of 80.2 p.s.i.g. of hydrogen was absorbed during the reaction. The total reaction time was 410 minutes.

The reaction mixture was removed from the hydrogenator and filtered to remove the catalyst into a distilling flask fitted with a 14-inch Vigreux column. The acetic acid solvent was removed at low temperature and reduced pressure and the residual liquid fractioned. The fractions obtained were as follows: 7-heptanolactone, 5.7 grams, 96–97° C./7 mm.; and tetrahydrofurylpropionic acid, 20.0 grams, 131–136° C./6 mm. The residue comprised 17.6 grams which were mainly polyesterified 7-hydroxyheptanoic acid.

*Example II*

20.7 grams (0.15 mol) of 3-(2-furyl) acrylic acid, 0.400 gram of platinum oxide, 150 mls. of acetic acid, and 5 drops of concentrated sulfuric acid were placed in a low-pressure Parr hydrogenator and hydrogenated in the manner described in Example I. A total of 43.0 p.s.i.g. of hydrogen was absorbed in 90 minutes.

The reaction product was removed from the hydrogenator and filtered to remove the catalyst. 5 drops of additional sulfuric acid were added to the solution and the solution refluxed for 18 hours. The solution was then cooled and diluted with 2 volumes of water. The resulting solution was then extracted 5 times with 30 mls. of chloroform. The extracts were filtered and the volatiles removed at low temperature and reduced pressure. The resulting residual oil was then fractioned through a 14-inch Vigreux column. The following fractions were obtained: 4-heptanolactone, 4.2 grams, 65–68° C./2 mm.; and an acetoxy mixture, 18.3 grams, 133–136° C./2 mm. The residue weighed 2 grams and was essentially polyesterified 7-hydroxyheptanoic acid.

The acetoxy mixture mainly contained 7-acetoxyheptanoic acid and 7-acetoxy-4-hydroxyheptanoic acid lactone. Since the boiling points of the components of this mixture were close, the 7-acetoxyheptanoic acid was recovered by extracting it with a dilute sodium bicarbonate solution. The sodium bicarbonate extract was acidified with hydrochloric acid and extracted with chloroform. The volatiles were removed at low temperature and pressure and the extract distilled and the 7-acetoxyheptanoic acid recovered. The 7-acetoxyheptanoic acid comprised 44% of the acetoxy mixture.

*Example III*

20.7 grams (0.15 mol) of 3-(2-furyl) acrylic acid, 0.400 gram of platinum oxide, 150 mls. of ethanol, and 10 drops of concentrated sulfuric acid were placed in a Parr hydrogenator and hydrogenated in the manner described in Example I. A total of 43.9 p.s.i.g. of hydrogen was absorbed in 150 minutes at which time the hydrogen absorption rate was insignificant.

The reaction mixture was removed from the Parr hydrogenator, filtered from the catalyst, and heated at reflux for 2 hours. The volatiles were removed from the reaction mixture at low pressure and reduced temperature. The reaction mixture was diluted with 1 volume of water and the product exhaustively extracted with chloroform. After the removal of the chloroform from the extract, the residual oil was fractionally distilled through a semi-micro Vigreux column.

The products obtained were as follows: ethyl heptanoate, 1.2 grams, 60–65° C./6.5 mm.; lactone-ester mix, 13.0 grams, 90–93° C./6.5 mm.; ethyl 7-hydroxyheptanoate, 7.8 grams, 102–105° C./2.5 mm.; and a 1.7 gram residue containing mainly polyesterified 7-hydroxyheptanoic acid.

The lactone-ester mixture was hydrolyzed with sodium hydroxide followed by acidification, extraction, and distillation and was found to consist of approximately one-third 4-heptanolactone and two-thirds ethyltetrahydrofurylpropionate.

*Example IV*

A collection of polyester residues formed according to Example I was refluxed with a large excess of acetic acid and 5 drops of concentrated sulfuric acid for 2 hours. The refluxed product was then poured into ice water and extracted with several small portions of chloroform. The chloroform extracts were combined and the extracts fractioned. After removal of the low-boiling forerun, the 7-acetoxyheptanoic acid was collected. The 7-acetoxyheptanoic acid was a colorless liquid having a boiling point of 155° C. at 7 mm. pressure and a refractive index of $n_D^{20}$ 1.4475.

*Example V*

A collection of 18.8 grams (0.10 mol) of 7-acetoxyheptanoic acid produced according to Examples II and IV was mixed with 100 mls. of concentrated hydriodic acid and the mixture heated to the boiling point. The mixture was then cooled and diluted with 2 volumes of water and the diluted mixture chilled in ice water to precipitate the 7-iodoheptanoic acid. The 7-iodoheptanoic acid precipitated as yellow-brown crystals and was recrystallized from petroleum ether in the form of pale-yellow crystals having a melting point between 49.5 to 50.5° C.

12.8 grams (0.05 mol) of the 7-iodoheptanoic acid produced as above were mixed with 100 mls. of a 29.7% aqueous ammonia solution and maintained at a temperature of 45–50° C. for 70 hours. The mixture was then concentrated at reduced pressure at a temperature below 50° C., the concentrated syrup diluted with 40 mls. of ethanol, and placed in a refrigerator overnight to precipitate the 7-aminoheptanoic acid. The white 7-aminoheptanoic acid precipitate was then dried in an oven at 50° C.

*Example VI*

A collection of 17.4 grams (0.10 mol) of ethyl 7-hydroxyheptanoic acid produced according to Example II was dissolved in 100 mls. of ethanol and saturated with hydrogen bromide at 5° C. and allowed to stand overnight. The product was then washed with water and distilled giving 13.9 grams crude ethyl 7-bromoheptanoate as distillate boiling at 95–105° C. at 2.5 mm. pressure. The distillate was repeatedly washed with water to remove unchanged hydroxyester until a refractive index of $n_D^{20}$ 1.4600 was obtained. The total amount of pure ethyl 7-bromoheptanoate was 8.3 grams.

7.1 grams (0.03 mol) of the ethyl 7-bromoheptanoate produced above were dissolved in 15 mls. of ethanol and this solution added to 3.1 grams of 95% sodium cyanide dissolved in 10 mls. of water and the mixture refluxed for 22 hours. 5 grams of sodium hydroxide and 10 mls. of water were then added and the mixture refluxed for 7 additional hours. The reaction product was cooled and the suberic acid precipitated as tan crystals by acidifying the reaction product with hydrochloric acid. The suberic acid was recrystallized with charcoal and boiling water and 2.4 grams of pure suberic acid having a melting point of 139–140.5° C. were obtained.

I claim:
1. The method of producing 7-hydroxyheptanoic acid and derivatives thereof having the general formula

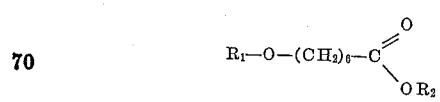

where $R_1$ is a member of the group consisting of hydrogen and an acetyl group and $R_2$ is a member of the group consisting of hydrogen and an alkyl radical which comprises hydrogenating a furan derivative having the general formula

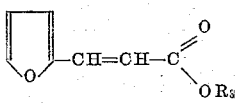

where $R_3$ is a member of the group consisting of hydrogen and an alkyl radical in the presence of a platinum catalyst and a small amount of an acid promoter and separating the 7-hydroxyheptanoic acid and derivatives thereof having the general formula

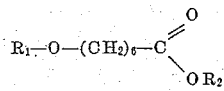

where $R_1$ is a member of the group consisting of hydrogen and an acetyl group and $R_2$ is a member of the group consisting of hydrogen and an alkyl radical from the reaction mixture.

2. The method of forming an ester derivative of 7-hydroxyheptanoic acid which comprises hydrogenating 3-(2-furyl) acrylic acid in the presence of an alcohol solvent, a platinum catalyst, and an acid promoter, and separating the 7-hydroxyheptanoic acid ester from the reaction mixture.

3. The method of forming polyesterified 7-hydroxyheptanoic acid which comprises hydrogenating 3-(2-furyl) acrylic acid in the presence of an inert solvent, a platinum catalyst, and an acid promoter, and separating the polyesterified 7-hydroxyheptanoic acid from the reaction mixture.

4. The method of forming 7-acetoxyheptanoic acid which comprises hydrogenating 3-(2-furyl) acrylic acid in the presence of acetic acid, a platinum catalyst, and an acid promoter, and separating the 7-acetoxyheptanoic acid from the reaction mixture.

5. The method of producing 7-hydroxyheptanoic acid which comprises hydrogenating 3-(2-furyl) acrylic acid in the presence of a platinum catalyst and an acid promoter, and separating the 7-hydroxyheptanoic acid from the mixture.

References Cited in the file of this patent

UNITED STATES PATENTS

| | | |
|---|---|---|
| 2,594,355 | Schwenk et al. | Apr. 29, 1952 |
| 2,657,220 | Alexander et al. | Oct. 27, 1953 |

OTHER REFERENCES

Dunlop et al.: "The Furans," 1953, pages 701 and 706.

UNITED STATES PATENT OFFICE
CERTIFICATE OF CORRECTION

Patent No. 2,955,133

October 4, 1960

Eugene V. Hort

It is hereby certified that error appears in the printed specification of the above numbered patent requiring correction and that the said Letters Patent should read as corrected below.

Column 2, line 70, for "60 p.s.i.g." read -- 50 p.s.i.g. --.

Signed and sealed this 11th day of April 1961.

(SEAL)
Attest:

ERNEST W. SWIDER
Attesting Officer

ARTHUR W. CROCKER
Acting Commissioner of Patents